US007231381B2

(12) United States Patent
Li et al.

(10) Patent No.: US 7,231,381 B2
(45) Date of Patent: Jun. 12, 2007

(54) MEDIA CONTENT SEARCH ENGINE INCORPORATING TEXT CONTENT AND USER LOG MINING

(75) Inventors: Mingjing Li, Beijing (CN); Hong-Jiang Zhang, Beijing (CN); Wen-Yin Liu, Beijing (CN); Zhen Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 09/805,626

(22) Filed: Mar. 13, 2001

(65) Prior Publication Data

US 2002/0161747 A1 Oct. 31, 2002

(51) Int. Cl.
*G06F 17/30* (2006.01)
(52) U.S. Cl. .................................. 707/3; 707/5; 707/6
(58) Field of Classification Search ............... 707/1–6, 707/100, 104.1, 14; 382/162, 167, 168–169
See application file for complete search history.

(56) References Cited

U.S. PATENT DOCUMENTS

| | | | |
|---|---|---|---|
| 5,442,778 A | | 8/1995 | Pedersen et al. |
| 5,619,709 A | * | 4/1997 | Caid et al. .................... 715/532 |
| 5,682,539 A | | 10/1997 | Conrad et al. |
| 5,734,886 A | | 3/1998 | Grosse et al. |
| 5,751,286 A | | 5/1998 | Barber et al. |
| 5,802,361 A | * | 9/1998 | Wang et al. ................. 382/217 |
| 5,809,498 A | | 9/1998 | Lopresti et al. |
| 5,819,273 A | | 10/1998 | Vora et al. |
| 5,855,015 A | * | 12/1998 | Shoham ........................... 707/5 |
| 5,873,056 A | * | 2/1999 | Liddy et al. ..................... 704/9 |
| 5,873,076 A | | 2/1999 | Barr et al. |
| 5,889,506 A | * | 3/1999 | Lopresti et al. .............. 345/158 |
| 5,893,095 A | * | 4/1999 | Jain et al. ........................ 707/6 |
| 5,899,999 A | * | 5/1999 | De Bonet ................. 707/104.1 |
| 5,963,940 A | | 10/1999 | Liddy et al. |
| 5,974,409 A | | 10/1999 | Sanu et al. |
| 5,983,237 A | * | 11/1999 | Jain et al. ................. 707/104.1 |
| 5,987,457 A | * | 11/1999 | Ballard ............................ 707/5 |

(Continued)

OTHER PUBLICATIONS

R. Agrawal, et al; "Fast Discovery of Association Rules," in Advances in Knowledge Discovery and Data Mining, Fayyad UM, Piatetsky-Shapiro G, Smyth P & Uthurusamy R. (eds), AAAI Press, Menlo Park, California, (1994), pp. 307-328.

(Continued)

*Primary Examiner*—Don Wong
*Assistant Examiner*—Hanh Thai
(74) *Attorney, Agent, or Firm*—Lee & Hayes, PLLC

(57) ABSTRACT

Text features corresponding to pieces of media content (e.g., images, audio, multimedia content, etc.) are extracted from media content sources. One or more text features (e.g., one or more words) for a piece of media content are extracted from text associated with the piece of media content and text feature vectors generated therefrom and used during subsequent searching. Additional low-level feature vectors may also be extracted from the piece of media content and used during the subsequent searching. Relevance feedback can also be received from a user(s) identifying the relevance of pieces of media content rendered to the user in response to his or her search request. The relevance feedback is logged and can be used in determining how to respond to subsequent search requests, such as by modifying feature vectors (e.g., text feature vectors) corresponding to the pieces of media content for which relevance feedback is received.

6 Claims, 6 Drawing Sheets

U.S. PATENT DOCUMENTS

| | | | |
|---|---|---|---|
| 5,999,942 A | | 12/1999 | Talati |
| 6,020,955 A | | 2/2000 | Messina |
| 6,038,560 A | * | 3/2000 | Wical .............................. 707/5 |
| 6,094,652 A | * | 7/2000 | Faisal ............................. 707/5 |
| 6,134,532 A | * | 10/2000 | Lazarus et al. ................ 705/14 |
| 6,169,986 B1 | | 1/2001 | Bowman et al. |
| 6,175,829 B1 | * | 1/2001 | Li et al. ......................... 707/3 |
| 6,189,002 B1 | * | 2/2001 | Roitblat ......................... 707/1 |
| 6,282,549 B1 | * | 8/2001 | Hoffert et al. ........... 707/104.1 |
| 6,304,864 B1 | * | 10/2001 | Liddy et al. ................... 706/15 |
| 6,311,194 B1 | * | 10/2001 | Sheth et al. ................. 715/505 |
| 6,345,274 B1 | | 2/2002 | Zhu et al. |
| 6,347,313 B1 | * | 2/2002 | Ma et al. ........................ 707/3 |
| 6,366,908 B1 | | 4/2002 | Chong et al. |
| 6,382,218 B1 | | 5/2002 | Cheng |
| 6,404,925 B1 | * | 6/2002 | Foote et al. ................. 382/224 |
| 6,480,843 B2 | | 11/2002 | Li |
| 6,510,406 B1 | * | 1/2003 | Marchisio ...................... 704/9 |
| 6,523,026 B1 | * | 2/2003 | Gillis ............................. 707/3 |
| 6,553,385 B2 | | 4/2003 | Johnson et al. |
| 6,567,797 B1 | * | 5/2003 | Schuetze et al. ................ 707/2 |
| 6,675,159 B1 | * | 1/2004 | Lin et al. ........................ 707/3 |
| 6,687,696 B2 | | 2/2004 | Hofmann et al. |
| 6,728,706 B2 | * | 4/2004 | Aggarwal et al. .............. 707/5 |
| 6,760,714 B1 | * | 7/2004 | Caid et al. ..................... 706/14 |
| 6,766,316 B2 | * | 7/2004 | Caudill et al. .................. 707/3 |
| 6,766,320 B1 | | 7/2004 | Wang et al. .................... 707/5 |
| 6,791,579 B2 | | 9/2004 | Markel |
| 6,832,218 B1 | | 12/2004 | Emens et al. |
| 6,859,802 B1 | * | 2/2005 | Rui ................................. 707/5 |
| 6,877,001 B2 | * | 4/2005 | Wolf et al. ..................... 707/3 |
| 6,895,552 B1 | | 5/2005 | Balabanovic et al. |
| 7,089,237 B2 | | 8/2006 | Turnbull et al. |
| 7,089,309 B2 | | 8/2006 | Ramaley et al. |
| 7,099,869 B1 | | 8/2006 | Forstall et al. |
| 2002/0028512 A1 | | 3/2002 | Lin et al. |
| 2002/0038299 A1 | | 3/2002 | Zernik et al. |
| 2002/0052933 A1 | | 5/2002 | Leonhard et al. |
| 2002/0073088 A1 | | 6/2002 | Beckmann et al. |
| 2002/0194200 A1 | | 12/2002 | Flank et al. |
| 2003/0028512 A1 | | 2/2003 | Stensmo |
| 2003/0050916 A1 | | 3/2003 | Ortega et al. |
| 2003/0229537 A1 | | 12/2003 | Dunning et al. |
| 2004/0111408 A1 | * | 6/2004 | Caudill et al. .................. 707/3 |

OTHER PUBLICATIONS

J. Allen, "Natural Language Understanding,"University of Rochester, 1994, pp. 23-25.

D. Bikel, et al; "Nymble: A High-Performance Learning Name-Finder," Proc. of the Fifth Conference on Applied Natural Language Processing, Association for Computational Linguistics, 1997, pp. 194-201.

M. Flickner et al; "Query by Image and Video Content: The QBIC System," IEEE Computer, Sep. 1995, pp. 23-32.

D. Harman, et al; "Inverted Files," Information Retrieval; Data Structures and Algorithms, Frakes WB and Baeza-Yates R (eds), 1992, Chapter 3, Prentice Hall, NY.

E. Horvitz et al; The Lumiere Project: Bayesian User Modeling for Inferring the Goals and Needs of Software Users,: Proc. of the 14th Conference on Uncertainty in Artifical Intelligence, 1998.

T. Joachims; "A Probabilistic Analysis of the Rocchio Algorithm with TFIDF for Text Categorization"; In Proc. of the Fourteenth International Conference on Machine Learning, Nashville, TN, Jul. 1997, pp. 143-151. Morgan Kaufmann Publisher, San Francisco, CA.

J.H Kim, et al; "A Rule-Based Named Entity Recognition System for Speech Input," In: Proc. of the Sixth International Conference on Spoken Language Processing, 2000, vol. 1, pp. 528-531.

N. Kosugi et al; "Practical Query-By-Humming System" Proc. of the 8th ACM International Conference on Multimedia, 2000, pp. 333-342.

Y. Lu et al; "A Unified Framework for Semantics and Feature Based Relevance Feedback in Image Retrieval Systems,"; Proc. of the 8th ACM International Conference on Multimedia, 2000, pp. 31-38.

TM Mitchell, "Machine Learning," 1997, pp. 176-183, McGraw-Hill.

Porter, M.F.; "An Algorithm for Suffix Stripping," Program, vol. 14, No. 3, pp. 130-137, Jul. 1980.

C.J. van Rijsbergen: "Information Retrieval," Butterworths, Department of Computing Science, University of Glasgow, 1979.

Shen, et al.; "Giving Meanigs to WWW Images,"; Proc. of the 8th ACM International Conference of Multimedia, 2000, pp. 39-48.

Gong, et al.; "An Image Database System with Content Capturing and Fast Image Indexing Abilities," Proceedings of IEEE International Conference on Multimedia Computing and Systems, 1994, pp. 131-130.

A. Ono; A Flexible Content-Based Image Retrieval System with Combined Scene Description Keywork,: Proceedings of IEEE International Conference on Multimedia Computing and Systems, 1996, pp. 201-208.

Zhang, et al; "A Scheme for Visual Feature based Image Indexing," To appear in SPIE Conference on Storage and Retrieval for Image and Video Databases, San Jose, CA Feb. 1995; ppl 1-12.

Z. Chen et al., "Web Mining for Web Image Retrieval", Journal of the American Society for Information Science & Technology, 52(10), pp. 831-839, Aug. 2001.

Lu, et al., "A Unified Framework for Semantics and Feature Based Relevance Feedback in Image Retrieval Systems" in: Proc. of the 8th ACM International Conference on Multimedia 2000 pp. 31-38.

Lu, et al., "A Unified Framework for Semantics and Feature Based Relevance Feedback in Image Retrieval Systems" in: Proc. of the 8th ACM International Conference on Multimedia 2000 pp. 31-38.

* cited by examiner

MEDIA CONTENT SEARCH ENGINE INCORPORATING TEXT CONTENT AND USER LOG MINING

TECHNICAL FIELD

This invention relates to media content searching, and more particularly to incorporating text content and user log mining in a media content search engine.

BACKGROUND OF THE INVENTION

The number of images, as well as other types of media content, that are available to users via their computers, especially with the evolution of the Internet, has become very large and is continuing to grow daily. One significant problem faced given this large and dynamic set of images is how to effectively retrieve images from it that match certain search criteria.

One attempted solution to retrieve images has been a manual text-based or keyword-based solution, in which a human operator assigns to each image in the set one or more keywords describing the image. During the image retrieval process, the search criteria are compared to the keywords of images in the set of images, and an image with keywords that match the search criteria are returned. However, because of the human operator required to manually assign keywords, this process is particularly slow and subjective.

Another attempted solution to retrieve images and overcome these problems of manual keyword assignment has been to use content-based image retrieval, in which low-level features of the images are extracted (e.g., color histogram, texture, shape, etc.) and compared to corresponding search features to identify matches. However, the use of such low-level features can be fairly inaccurate because it is difficult for low-level features to represent high-level semantic content of the images (e.g., how do you get low-level features to represent "summer"?).

An additional problem faced with image retrieval is the ever-expanding (open) base of images. Images are continually being made available via the Internet, so successful solutions to image retrieval problems should be able to account for an ever-changing image base.

The invention described below addresses these disadvantages, providing media content searching exploiting related high-level text features and user log mining.

SUMMARY OF THE INVENTION

Media content searching using related high-level text features and user log mining is described herein.

According to one aspect, text features corresponding to pieces of media content are extracted from media content sources. The media content pieces can be a variety of types of media content, such as images, audio, multimedia content, etc. One or more text features (e.g., one or more words) for a piece of media content are extracted from text associated with the piece of media content. A text feature vector is generated from these extracted text features and made available for comparison to a query vector during subsequent searches. Additional low-level feature vectors may also be extracted from the piece of media content and used during the comparison process.

According to another aspect, relevance feedback is received from a user(s) identifying the relevance of pieces of media content rendered to the user in response to his or her search request. The relevance feedback is logged and can be used in determining how to respond to subsequent search requests. One example use is to modify feature vectors corresponding to the pieces of media content for which relevance feedback is received. Another example use is to weight different elements of feature vectors differently based on the manner in which the elements were extracted. Another example is to weight different types of feature vectors differently.

BRIEF DESCRIPTION OF THE DRAWINGS

The present invention is illustrated by way of, but not limited to, examples in the figures of the accompanying drawings. The same numbers are used throughout the figures to reference like components and/or features.

DETAILED DESCRIPTION

Figure 1:
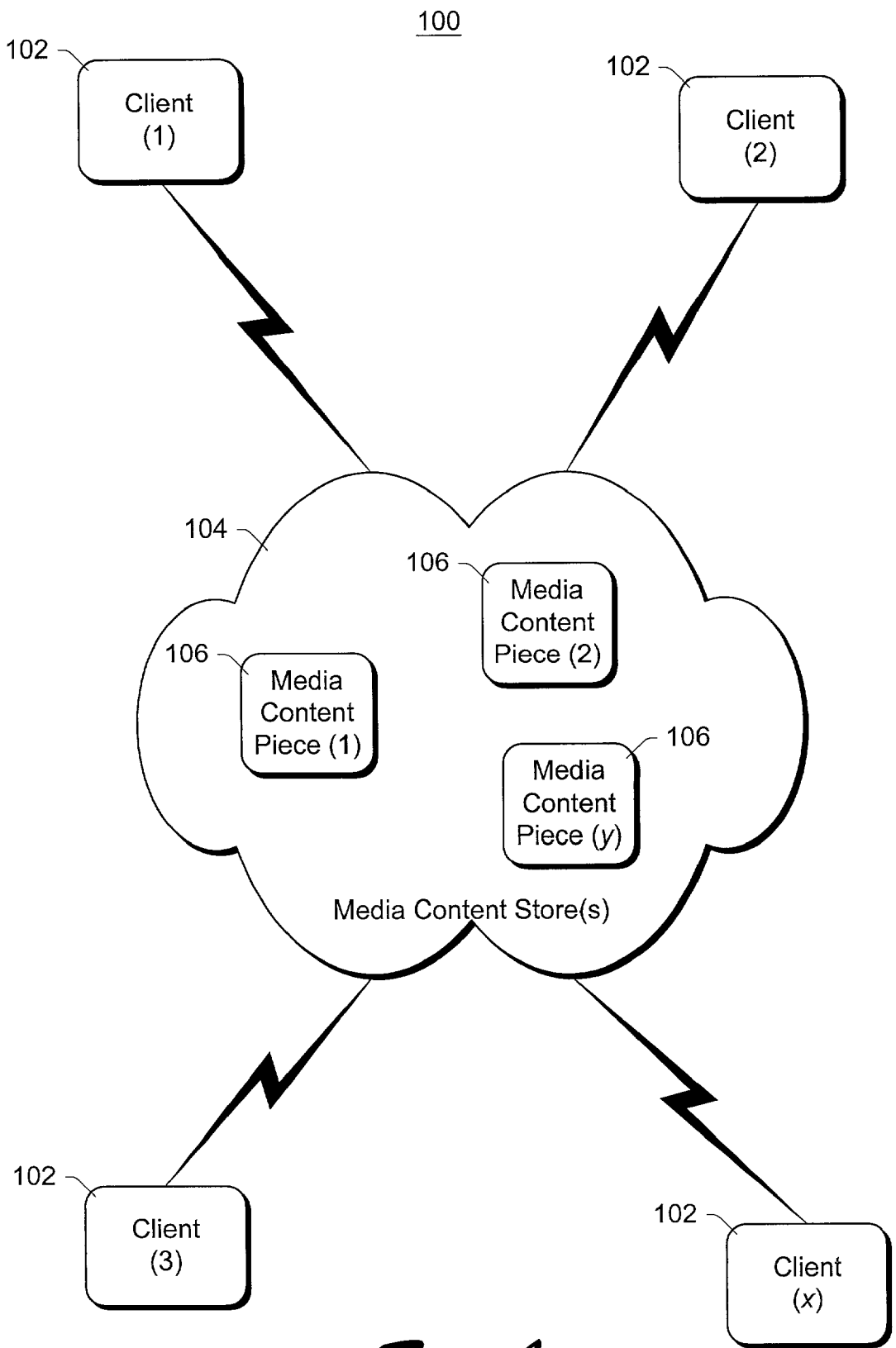
FIG. 1 illustrates an exemplary environment in which the invention can be practiced.

FIG. 1 illustrates an exemplary environment in which the invention can be practiced. In environment 100 multiple (x) clients 102 are coupled to a media content store 104. Media content store 104 includes multiple (y) pieces of media content 106. Clients 102 can search media content store 104 to identify pieces of media content 106 that satisfy a set of search criteria. The search criteria can be received from any of a wide variety of sources such as a user of a client 102, a program executing on a client 102, etc.

Media content store 104 represents a set of one or more sources from which media content can be received by a client 102. The storage of media content pieces 106 within media content store 104 can be arranged in any of a wide variety of manners and according to any of a wide variety of formats. For example, media content pieces 106 may be stored on multiple servers accessible using HTTP (Hypertext Transfer Protocol). Media content pieces 106 can be any of a wide variety of conventional media content, such as audio content, video content (for example, still images or frames of motion video), multimedia content, etc. A piece of media content refers to media content that can be rendered, such as a single visual image, an audio clip (e.g., a song or portion of a song), a multimedia clip (e.g., an audio/video program or portion of an audio/video program), etc. Although discussed primarily with reference to images, the invention can be used with a wide variety of conventional media content.

In the illustrated example, a client 102 can search media content store 104 for pieces of media content 106 that match a set of search criteria. This search criteria includes both low-level features and high-level features. Low-level features are features that describe various low-level characteristics of the media content piece. For example, low-level features for image content may include color, texture, and shape features. High-level features are text features that are extracted from text associated with the media content piece, as discussed in more detail below. These low-level and high-level features corresponding to the media content piece 106 are compared to the set of search criteria to determine how closely the respective features match the set of search criteria. The results of these comparisons are then combined and the value resulting from the combination is used to determine how well the media content matches the set of search criteria.

Figure 2:
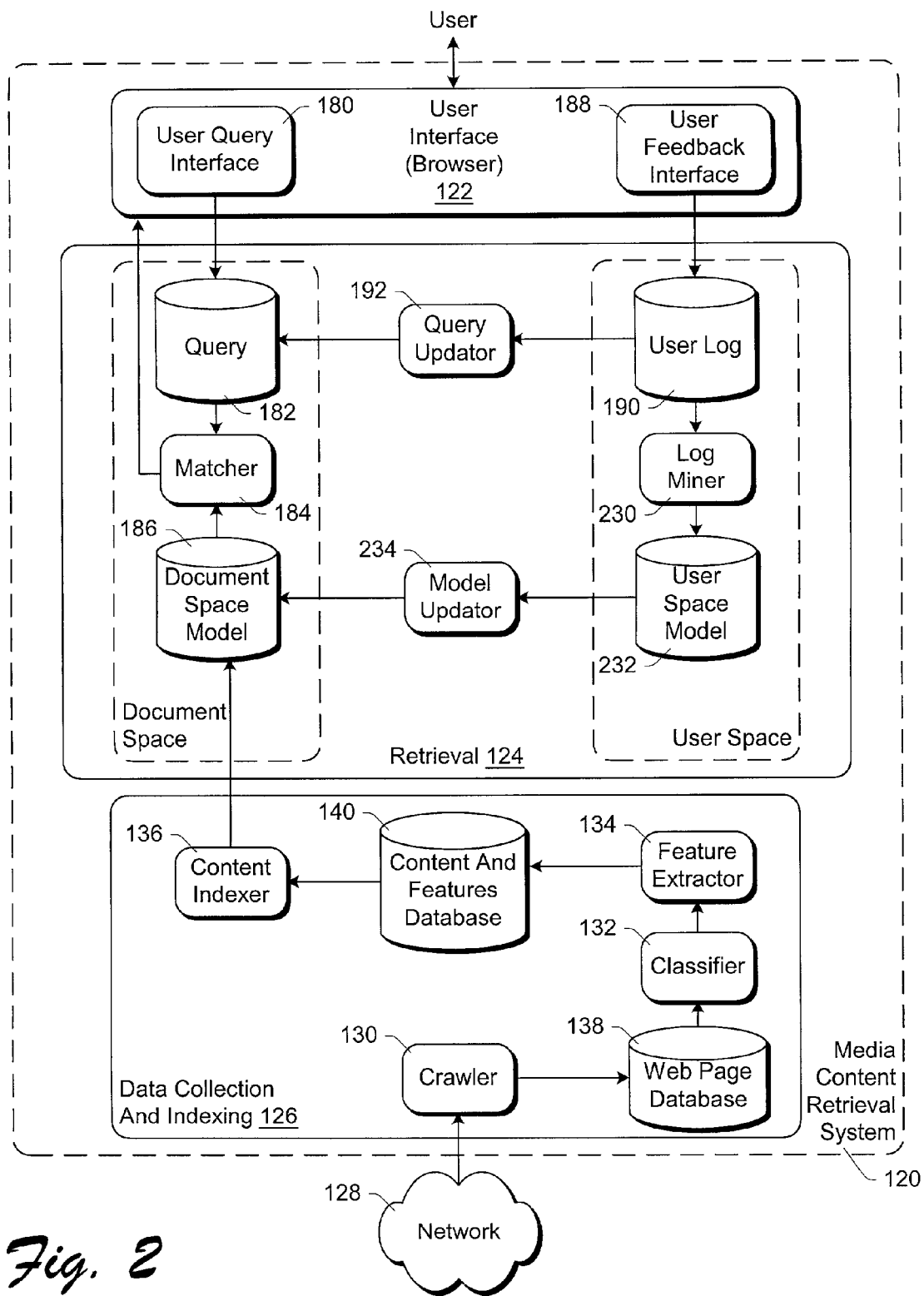
FIG. 2 illustrates an exemplary media content retrieval system in accordance with certain embodiments of the invention.

FIG. 2 illustrates an exemplary media content retrieval system 120 in accordance with certain embodiments of the invention. Media content retrieval system 120 is discussed primarily with reference to media content retrieval based on media content sources hosting web pages accessible via a network (e.g., the Internet and/or an intranet). Web pages are documents that users can view or otherwise render and which typically include links to one or more other pages that the user can access. Web pages are typically stored as one or more files at a remote location(s), being accessed by a user via his or her computer and a network. Web pages often include multiple pieces of media content, such as both images and text. Web pages may be part of the World Wide Web (also referred to as the "web"), which is a widely-accessible collection of web pages stored on different remote servers throughout the world. Web pages may also be stored in semi-private or private networks, such as a corporate intranet that is not accessible by anyone outside the corporation, or accessible only with a particular id and/or password. Although discussed primarily with reference to media content retrieval based on web pages, the invention may also be used for media content retrieval based on media content stored and/or accessed in any of a variety of formats.

Media content retrieval system 120 includes a user interface component 122, a retrieval component 124, and a data collection and indexing component 126. Directional arrows in FIG. 2 illustrate the flow of data among the components and modules of FIG. 2. In one implementation, user interface component 122 and retrieval component 124 are implemented on the same computing device (e.g., a client computing device) and data collection and indexing component 126 is implemented on another computing device (e.g., a remote server computing device). Alternatively, components 122–126 may be implemented in different manners, such as each component 122, 124, and 126 being implemented on one or more different computing devices. Additionally, the various modules, models, and/or databases of each component 122–126 may be implemented on the same computing device or alternatively on multiple different computing devices.

Data collection and indexing component 126 operates independently of retrieval component 124 to locate and index pieces of media content available from various sources, such as via a network 128 (e.g., the Internet). When a media content search request is made (e.g., by a user via user interface component 122), retrieval component 124 receives the search request and accesses collection and indexing component 126 to determine which pieces of media content to return in response to the search request. The pieces of media content that are "searched" in response to the search request are those pieces of media content that have been indexed by collection and indexing component 126. Collection and indexing component 126 is designed to access sources to collect and index new pieces of media content from various sources (such as pre-existing sources with changed or new media content, new sources with new media content, etc.). Component 126 may access sources frequently, such as continually, at scheduled intervals, at regular or irregular periods of time, etc. Alternatively, component 126 may be provided with a set of representative sources (e.g., a set of web sites that are sports-related) and collect and index media content only from those sources rather than attempting to locate new sources.

Data collection and indexing component 126 includes a crawler module 130, a classification module 132, a feature extractor module 134, a media content indexer module 136, a web page database 138, and a media content and features database 140. Crawler module 130 searches media content sources (e.g., web servers) via network 128 to identify web pages by following links (e.g., hypertext links) from one page to another (which typically results in accessing multiple different web servers as well). When crawler module 130 identifies a web page that it has not yet indexed (e.g., a new web page or a web page whose media content has been altered since it was indexed by component 126), crawler module 130 copies the web page to web page database 138. Crawler module 130 copies all of the pieces of media content on the web page, including any images and any text on the web page.

In one implementation, each web page is written in a markup language, such as HTML (Hypertext Markup Language), XML (Extensible Markup Language), SGML (Standard Generalized Markup Language), etc. Using such a markup language, a set of labels (often referred to as "tags") are embedded within text to identify individual elements or groups of elements for display or identification purposes. When accessing a web page written in a markup language, the source text is available to the module accessing the page. This source text is stored by crawler 130 into web page database 138.

Web pages are typically designed to include references to images, audio clips, multimedia clips, or other pieces of media content that are to be loaded by a user interface (often referred to as a browser) and rendered as part of the web page. As part of the web page rendering process, the browser retrieves these referenced media content pieces and renders them in the manner indicated by the web page. These referenced media content pieces may be stored at the same location as the web page, or alternatively at another location (e.g., a remote server). It should be noted that these references are different from links that are part of the web page—the referenced media content pieces are pieces of media content that are rendered in order to fully render the web page, whereas links on the web page identify other web pages that can be loaded and rendered. During the collection process, crawler 130 loads these referenced media content pieces and stores them in database 138. This storage allows low-level features to be extracted from the media content pieces, as discussed in more detail below. Alternatively, if low-level features are not being analyzed, then the media content pieces need not be stored in database 138.

For each web page stored in web page database 138, classification module 132 classifies the pieces of media content that are part of the web page (including those that are referenced in the web page, such as by filename) as either meaningful or not meaningful. Those pieces of media content that are classified as meaningful are then identified to feature extractor 134 for extraction of various features for the media content piece, as discussed in more detail below. Those pieces of media content that are classified as not meaningful are not further processed (and are ignored by feature extractor 134).

In one implementation, classifier 132 uses a set of rules to classify each of the pieces of media content as either meaningful or not meaningful. These rules are based on various information regarding the media content, such as a color histogram of an image (e.g., an image that is predominately one color is not meaningful), the size of an image (e.g., an image less than a threshold size (such as 32×32 pixels) is not meaningful), the type of file (e.g., an image file that is a banner is not meaningful), etc. The rules to be used can vary, and in one implementation are determined empirically.

For each media content piece that is classified as meaningful, feature extractor 134 extracts various features from the media content piece. These extracted features include low-level features that are extracted based on the media content piece itself, as well as high-level features that are extracted based on text associated with the media content piece.

Feature extractor 134 can extract any of a wide variety of conventional low-level features from the media content piece. In the illustrated example, each media content piece is an image and feature extractor 134 extracts six low-level features from the image. Each of these six features are well-known, and are: (1) the 256-bin HSV (hue saturation value) color histogram, (2) the first, second, and third HSV color moments, (3) the HSV color coherence, (4) the Tamura coarseness vector, (5) the pyramid wavelet texture, and (6) the MRSAR (multiresolution simultaneous autoregressive models). For additional information regarding these features, the reader is directed to Ma W. Y. and Zhang H. J., "Content-Based Image Indexing and Retrieval", *Handbook of Multimedia Computing*, Chapter 11, Borko Furht (ed.), CRC Press, 1998.

Feature extractor 134 further extracts high-level features, also referred to herein as text features, for a media content piece based on text associated with the piece. In the illustrated example, each media content piece is an image and each text feature is a word that is associated with the image. The text features can be extracted by feature extractor 134 in a variety of different manners. In one implementation, text features are extracted based on up to six aspects of the text associated with an image: (1) image filename and identifier, (2) image annotation, (3) alternate text, (4) surrounding text, (5) page title, and (6) other information. Note that all of these aspects may not be associated with each image, and thus features are not extracted based on aspects that are not available for an image.

(1) Image filename and identifier: each image is identified by a filename that is typically part of a larger identifier that indicates where the file is located (e.g., a URL (Uniform Resource Locator)). Often times meaningful names are used as filenames and/or the identifier (e.g., URL) for an image. Each word in the filename and identifier can be used as a text feature. In one implementation, a set of rules is used to judge the usefulness of the filenames and URL for an image, and thereby limit the words used as text features.

One rule is that the filename be segmented into meaningful key words. Based on a standard dictionary (or alternatively a specialized dictionary), the filename is analyzed to determine whether it includes one or more words that are in the dictionary. Each such word is identified as a key word. For example, the filename "redflower.jpg" would be segmented into the key words "red" and "flower", each of which would be a text feature (assuming they each existed in the dictionary).

Another rule is that certain common words (e.g., articles) are excluded from being considered key words. For example, the filename "theredflower.jpg" could be segmented into the words "the", "red", and "flower", but only "red" and "flower" would be text features (the word "the" would not be in the dictionary and thus not identified as a key word). Other insignificant characters and groups of characters can also be excluded, such as digits, hyphens, other punctuation marks, filename extensions, etc.

Another rule applies to the URL for an image. A URL typically represents the hierarchy information of the image. The URL is parsed and segmented to identify each word in the URL, and then resulting meaningful key words are used as text features. For example, in the URL " . . . /images/animals/anim_birds.jpg", the words "animals" and "birds" are meaningful key words that would be extracted as images. A dictionary can be used to identify the meaningful key words as discussed above. For example, the word "images" would not be meaningful as only images are being analyzed.

(2) Image annotation: each image can have a corresponding image annotation which is a text label describing the semantics of the image, typically input by the creator of the image file. As this image annotation is intended to describe the semantics of the image, it typically includes valuable information describing the image. Thus, each word in the image annotation is a key feature (although certain common words and/or insignificant characters/character groups may be excluded as discussed above regarding image filenames and identifiers).

(3) Alternate text: many web pages include alternate text for images. This alternate text is to be displayed in place of the image in certain situations (e.g., for text-based browsers). As this alternate text is intended to replace the image, it often includes valuable information describing the image. Thus, each word in the alternate text is a key feature (although certain common words and/or insignificant characters/character groups may be excluded as discussed above regarding image filenames and identifiers).

(4) Surrounding text: many web pages have text surrounding the images on the rendered web page. This text frequently enhances the media content that the web page designers are trying to present, and thus is frequently valuable information describing the image. Thus, key words from the text surrounding the image (e.g., text above the image, below the image, to the left of the image, and to the right of the image) are extracted as text features (certain common words and/or insignificant characters/character groups may be excluded as discussed above regarding image filenames and identifiers). The amount of text surrounding an image from which key words are extracted can vary. In one implementation, the three lines (or sentences) of text that are closest to (adjacent to) the image are used, or alternatively the entire paragraph closest to (adjacent to) the image can be used. Alternatively, if information is available regarding the layout of the web page, then the single sentence (or line) most related to the image can be used.

(5) Page title: many times a web page will have a title. If the web page does have a title, then key words are identified in the title and used as text features (certain common words and/or insignificant characters/character groups may be excluded as discussed above regarding image filenames and identifiers).

(6) Other information: various other information from the web page may also be used to obtain words to be used as text features associated with an image. For example, each URL on the page that is a link to another web page may be parsed and segmented and meaningful key words extracted from the URL (analogous to the discussion above regarding extracting meaningful key words from the URL of the image). By way of another example, meaningful key words may be extracted from "anchor text" that corresponds to the image. Anchor text refers to text that is identified on the web page as text that should be kept near or next to the image (e.g., which would cause the browser to move the text to a next page if the image were to be displayed on the next page). Key words can be extracted from the anchor text analogous to the discussion above regarding extracting meaningful key words from the alternate text.

After applying these various rules, feature extractor 134 has a set of words that are text features extracted from the image. Note that certain words may be extracted multiple times and thus appear in the set multiple times. Feature extractor 134 stores these features (both low-level and high-level) and an identifier of the media content piece (e.g., a URL) in media content and features database 140. The media content piece itself may also optionally be stored in database 140. Once stored, feature extractor 134 extracts features from another media content piece available from web page database 138.

Media content indexer 136 takes the extracted features for an image from media content and features database 140 and indexes the media content piece. The indexing process refers to generating, as necessary, feature vectors corresponding to the media content piece and storing a correlation between the generated feature vectors and the media content piece. These generated feature vectors can be stored in database 140 or alternatively elsewhere. For low-level features, the extracted features are each a feature vector that is stored in database 140 by feature extractor 134, and thus no additional extraction or generation by indexer 136 is necessary. Alternatively, indexer 136 may combine (e.g., concatenate) the individual elements of each low-level feature vector for an image into a single low-level feature vector for the image.

For high-level features (text features), however, the extracted features are a set of words. Media content indexer 136 converts this set of words into a text feature vector $D_i$ for image i using the well-known TF*IDF method:

$$D_i = TF_i * IDF_i = \left(t_{i1} * \log\frac{N}{n_1}, \ldots, t_{ij} * \log\frac{N}{n_j}, \ldots, t_{im} * \log\frac{N}{n_m}\right)$$

where m represents the total number of different keywords maintained in database 140, $t_{ij}$ represents the frequency of keyword j appearing in the extracted set of words associated with image i, $n_j$ represents the number of images identified in database 140 that contain the keyword j, and N represents the total number of images in database 140. Each keyword in the text feature vector of an image is thus weighted based on how frequently it appears in the text associated with the image as well as how frequently it appears in the text associated with all images identified in database 140. The resultant text feature vector $D_i$ for image i thus includes a numerical element for each word that is in the text associated with at least one image identified in database 140 (if the word is not associated with image i then the value for that element is zero).

Once the feature vectors (both low-level and high-level) for an image are generated, media content indexer 136 makes the feature vectors available to retrieval system 124 for searching. Each time new features are added to database 140, the previously generated feature vectors are re-generated. Media content indexer 136 may generate (and re-generate) feature vectors based on the features in database 140 as soon as new features are added to database 140, or alternatively wait for multiple new features to be added to database 140, or wait for a particular time (e.g., wait until early morning when fewer users will be attempting searches).

Figure 3:
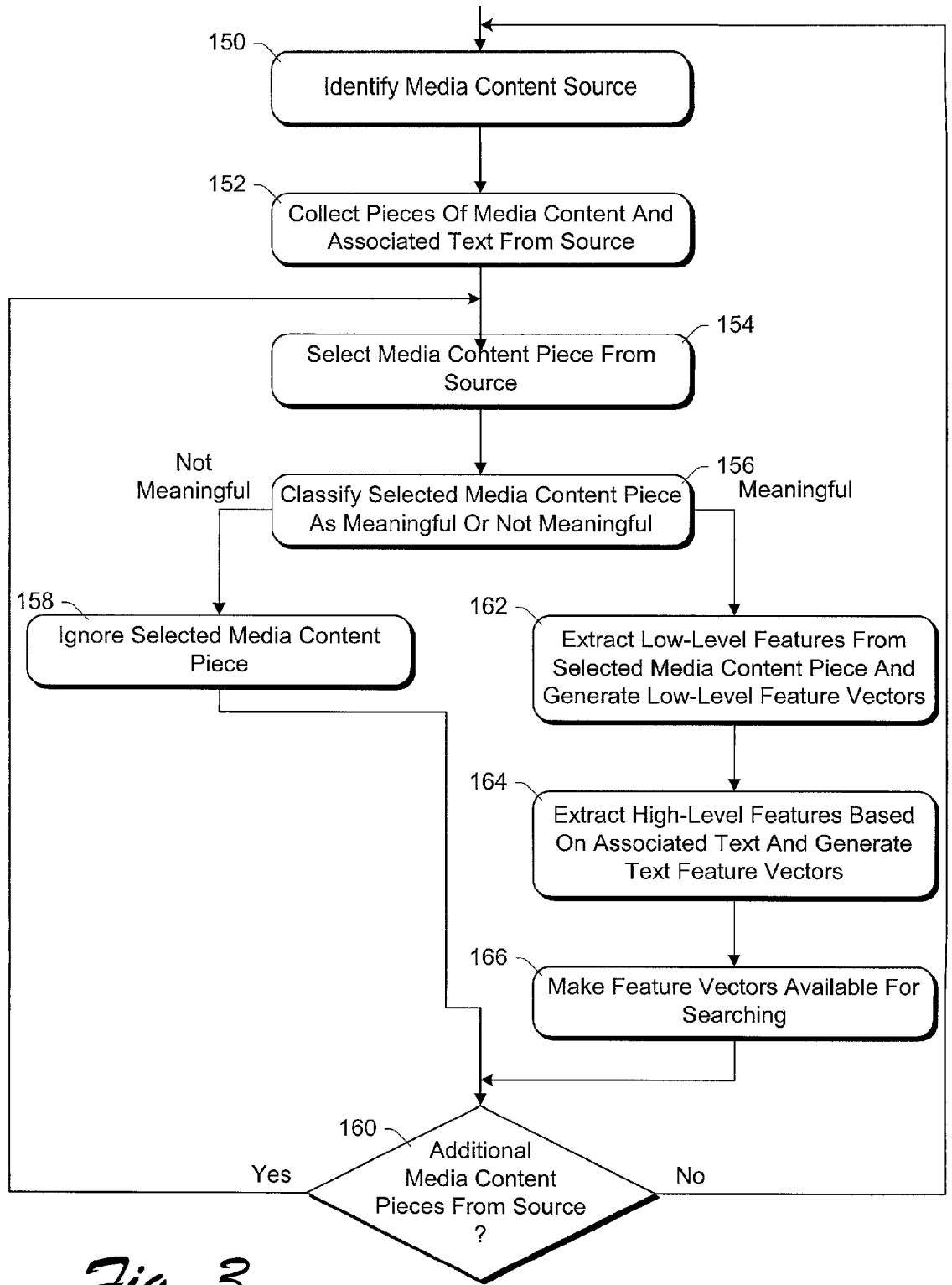
FIG. 3 is a flowchart illustrating an exemplary process for collecting and indexing pieces of media content from web pages in accordance with certain embodiments of the invention.

FIG. 3 is a flowchart illustrating an exemplary process for collecting and indexing pieces of media content from web pages in accordance with certain embodiments of the invention. The process of FIG. 3 is performed by data collection and indexing component 126 of FIG. 2, and may be performed in software.

Initially, a media content source (e.g., a web site or server) is identified (act 150). Pieces of media content and associated text are collected from the media content source (act 152), and one media content piece is selected from the identified source (act 154). The selected media content piece is then classified as either meaningful or not meaningful (act 156). If the media content piece is classified as not meaningful, then the media content piece is ignored (act 158) and a check made as to whether there are additional media content pieces available from the source (act 160). If there are additional media content pieces, then the process returns to select another media content piece from the source (act 154). However, if there are not additional media content pieces, then the process returns to identify another media content source (act 150).

Returning to act 156, if the media content piece is classified as meaningful, then low-level features are extracted from the media content piece and low-level feature vectors generated (act 162). Additionally, high-level features are extracted from the media content piece and high-level feature vectors generated (act 164). These extracted feature vectors (both low-level and high-level) are then made available for searching (act 166). A check is then made as to whether there are additional media content pieces available from the source (act 160), and processing continues at either act 150 or act 154 accordingly.

Returning to FIG. 2, the image retrieval process is initiated by a user via a user query interface 180 of user interface 122. Alternatively, the image retrieval process may be initiated by another component or module (e.g., another application performing an automatic search or a search in response to a user request).

The image retrieval process is based on a set of search criteria, which can include low-level and/or high-level feature vectors. In one implementation, a user initiates the image retrieval process by inputting a textual description of the types of images he or she desires. This textual description is then converted to a text feature vector and stored in a query record 182 of retrieval system 124. Once an initial set of images is returned, low-level feature vectors can be extracted based on relevance feedback provided by the user (as discussed in more detail below). Alternatively, a user may also input a piece of media content from which low-level feature vectors can be generated (e.g., the user may indicate he or she would like to see more pictures like the one he or she provided), or a default low-level feature vector may be used. Regardless of which feature vectors are used for the search criteria (low-level and/or high-level feature vectors), the feature vector(s) used for the search criteria are referred to as the query vectors.

The query vectors can be generated by interface module 180 or a module of retrieval system 124 (e.g., matcher 184 or another module (not shown)) and stored in query record 182. The low-level query vector is generated by extracting and concatenating the low-level features from the input image in the same manner as the low-level features were extracted from the source images (discussed above with reference to feature extractor 134). The high-level query vector is generated by extracting keywords from the search criteria and building a query vector (having the same number of elements as the text feature vectors in database 140, and each element corresponding to the same keyword as the corresponding element in the text feature vectors) by assigning a value of one to the element corresponding to each extracted keyword and a value of zero for the other elements. If an image is used for the search criteria, then keywords of any text description corresponding to that image are extracted and used to generate the initial high-level query vector. The keywords can be extracted in the same manner as discussed above with reference to feature extractor 134. The high-level query vector can then be generated by assigning a value of one to the element corresponding to each extracted keyword and a value of zero for all other elements. If the image retrieval process is initiated based on both an input text description and an input image, the high-level query vector is generated based on extracted keywords from both the input text and the input image. For example, initial vectors may be generated as discussed above (assigning a value of one to the element corresponding to each keyword), and then the vectors combined (e.g., elements added together or averaged on a per-element basis) to generate the initial high-level query vector.

A matching module 184 compares the query vectors to the feature vectors in a document space model 186 and determines how closely the query vectors match the feature vectors in document space model 186. Document space model 186 includes the feature vectors made available for searching by media content indexer 136, optionally modified based on user-log data mining as discussed in more detail below. For those feature vectors in document space model 186 that closely match the query vectors, matcher 184 returns an indication of the media content pieces corresponding to those feature vectors to user interface component 122 for rendering to the user.

Matching module 184 performs its comparison of query vectors to feature vectors based on both the low-level and high-level query and feature vectors (assuming both are available). Matching module 184 can perform the comparison in any of a wide variety of manners. In one implementation, matching module 184 performs the comparison by comparing the low-level vectors and high-level vectors separately, and then linearly combining the result. Thus, the similarity (Sim) between a query q and an image $D_i$ is calculated as follows:

$$\mathrm{Sim}(q, D_i) = \alpha S_l(q_l, D_{i_l}) + (1-\alpha) S_h(q_h, D_{i_h})$$

where α is a weighting indicating the importance of the low-level features and the high-level features relative to each other, $S_l(q_l, D_{i_l})$ is the similarity between the low-level query vector and the low-level feature vector of the image $D_i$, and $S_h(q_h, D_{i_h})$ is the similarity between the high-level query vector and the high-level feature vector of the image $D_i$. In one implementation, the initial value of α is set empirically, such as $S_l$=0.5, $S_h$=0.5. During the log mining process, discussed in more detail below, the value of α can be calculated for different queries based on the user log. For example, we can find that low-level features are not important when the query is "Clinton", while the low-level features are important when the query is "sunset".

The similarity between the low-level query vector and the low-level feature vector of the image $D_i$, $S_l(q_l, D_{i_l})$, is calculated using the Euclidean distance as follows:

$$S_l(q_l, D_{i_l}) = \sqrt{\sum_{y=1}^{z} (q_y - D_{i_y})^2}$$

where y represents the total number of elements in the low-level feature vector of the image $D_i$.

The similarity, referred to as $S_h(q_h, D_{i_h})$, between the high-level query vector $q_h$ and the high-level feature vector of the image $D_i$, referred to as $D_{i_h}$ is calculated using the dot product of the query's text feature vector and the image's text feature vector as follows:

$$S_h(q_h, D_{i_h}) = \frac{q_h \cdot D_{i_h}}{|q_h||D_{i_h}|}$$

Matching module 184 may determine which images to return to user interface component 122 as matching or satisfying the search criteria in a variety of different manners. In one implementation, matching module 184 compares the similarity of each image to the query vectors to a threshold value—if the numerical value representing the similarity of an image to the query vectors exceeds the threshold value then the image is a "match" and returned to interface component 122, and if the numerical value dues not exceed the threshold value then the image is not a match and is not returned to interface component 122. In another implementation, matching module 184 compares the similarity of all images available from media content indexer 136 to the query vectors and returns the images with the highest similarities (the highest numerical values representing similarity) to interface component 122. Matcher 184 may return the actual images to interface 122, or alternatively only identifiers of the images (e.g., URLs) in response to which interface 122 can access and load the identified images.

After the initial set of images is returned to interface component 122, the user is given the opportunity via user feedback interface 188 to indicate, for each returned image, whether the image is relevant or irrelevant. This feedback can be input in a variety of manners, such as user-selectable "+" and "−" signs to indicate relevant and irrelevant, respectively, or a user-selectable checkmark and X to indicate relevant and irrelevant, respectively, etc. Once input, this relevance feedback is stored in a user log 190. In the illustrated example, user log 190 stores, for each image that was marked relevant or irrelevant, an indication of the image, an indication of whether it was marked as relevant or irrelevant, and the query that resulted in retrieval of the image (e.g., the text and/or image input by the user as the initial search criteria, or the query vectors generated therefrom).

Query updating module 192 accesses the relevance feedback from user log 190 and updates the query vectors in query vector 182 to reflect the relevance feedback provided by the user. Each of the low-level and high-level query vectors is modified as follows:

$$Q' = Q + \beta \frac{\sum Q^+}{n^+} - \gamma \frac{\sum Q^-}{n^-}$$

where Q' represents the updated query vector, Q represents the original query vector, $Q^+$ represents the set of feature vectors of the positive (relevant) images, $n^+$ represents the number of positive (relevant) images, $Q^-$ represents the set of feature vectors of the negative (irrelevant) images, $n^-$ represents the number of negative (irrelevant) images, β represents a weighting for positive feedback, and γ represents a weighting for negative feedback. Initially, the values of β and γ are set empirically, such as β=1.0 and γ=0.5. Alternatively, if some training data is available, the parameters can be tuned using the training data to improve the performance of the retrieval.

If a query vector did not previously exist, then an initial query vector can be generated based on the relevance feedback. For example, the feature vectors of the relevant images may be averaged together to generate a low-level query vector.

Once the new query vectors are generated, matching module 184 repeats its comparison process using the updated query vectors, and returns a new set of closely matching media content pieces to user interface component 122. This feedback process can be repeated multiple times.

Figure 4:
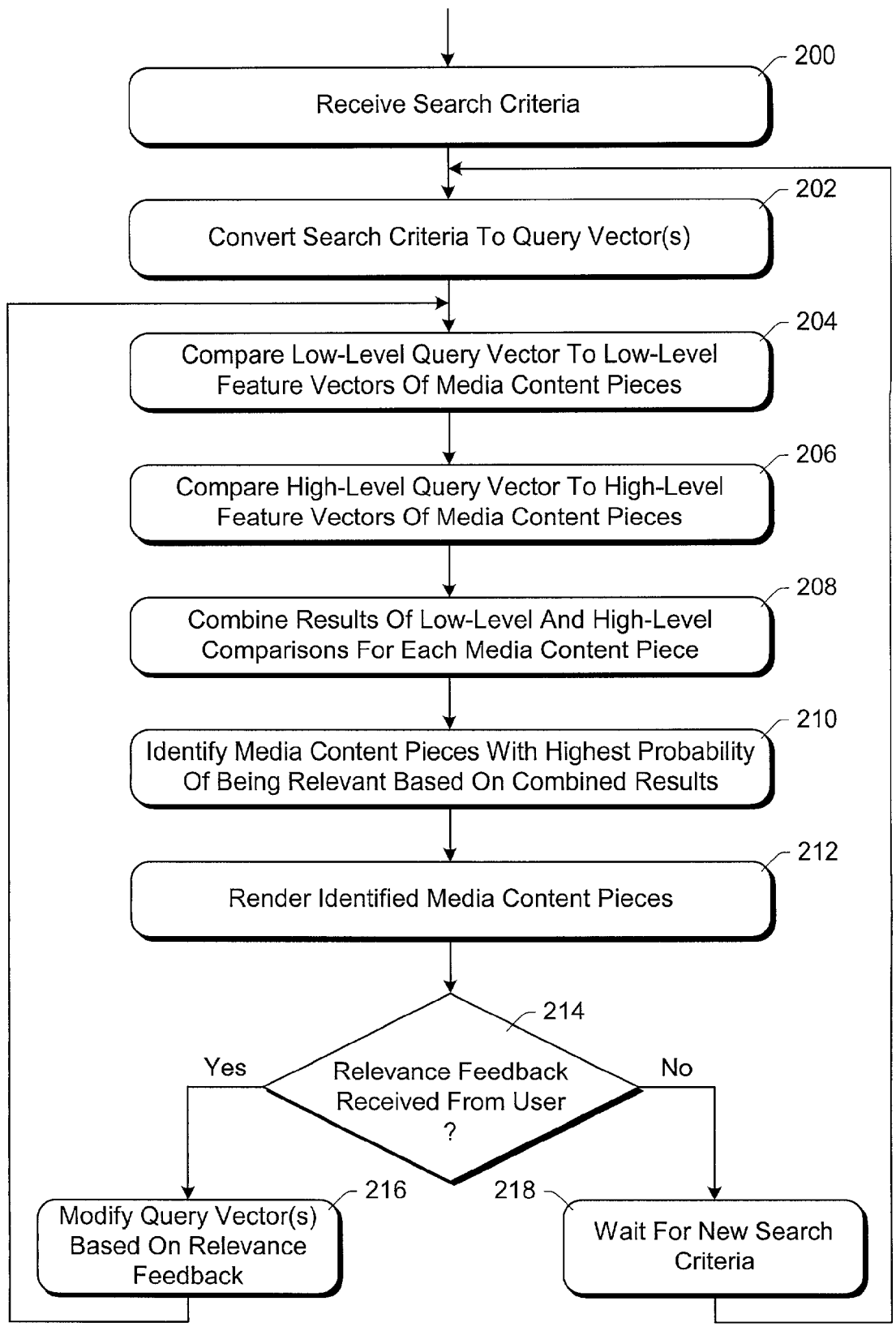
FIG. 4 is a flowchart illustrating an exemplary media content retrieval process in accordance with certain embodiments of the invention.

FIG. 4 is a flowchart illustrating an exemplary media content retrieval process in accordance with certain embodiments of the invention. The process of FIG. 4 is performed by retrieval component 124, and may be implemented in software.

Initially, search criteria are received (act 200). The search criteria are converted to high-level and/or low-level query vectors (act 202). Assuming both high-level and low-level query vectors are created, the low-level query vector is compared to the low-level feature vectors of the media content pieces (act 204), and the high-level query vector is compared to the high-level feature vectors of the media content pieces (act 206). The results of the comparisons in acts 204 and 206 are then combined (act 208) and the media content pieces with the highest probability of being relevant (those most similar to the search criteria) are identified (act 210). The identified media content pieces are then rendered (act 212).

Continued processing is dependent on whether relevance feedback of the rendered media content pieces is received from the user (act 214). If relevance feedback is received, then the query vectors are modified (updated) based on the received relevance feedback (act 216) and the process returns to act 204 to compare the modified query vectors to the feature vectors of the media content pieces. However, if relevance feedback is not received, then the process waits for new search criteria to be received (act 218) and then returns to act 202 to perform a search based on the new search criteria.

Returning to FIG. 2, the user feedback stored in user log 190 is also used to generate a user space model that will modify document space model 186. A log mining module 230 accesses the information stored in user log 190 and generates a user space model 232 based on the information in user log 190. A model updating module 234 then uses the generated user space model 232 to modify document space model 186 to improve the accuracy of the document space model 186 and thus the performance of the retrieval process as discussed in more detail below.

Log mining module 230 waits until a threshold amount of information is available in user log 190 before generating user space model 232. In one implementation this threshold is set based on the number of times the same query is made (e.g., the same query vector(s) is used) by different users. If at least the threshold number of users (e.g., at least three users) ask the same query, then feedback on this query is reliable/confident and log mining module 230 generates user space model 232. Log mining module 230 then re-generates user space model 232 as new information is added to user log 190. User log 190 may be user-specific or alternatively shared by all users (that is, the feedback from each user may be stored in his or her individual user log, or alternatively the feedback from all users of interface component 122 may be stored in the same user log).

For each image identified in user log 190 (each image that was marked as relevant or irrelevant by a user), a vector U is generated and referred to as the user space model of the image. Collectively, these vectors U are the user space model 232. Model updator 234 then uses these generated vectors U to modify document space model 186 and improve the image retrieval process as discussed below.

For a given relevant image $I_{ri}$ in user log 190, a user space vector U is generated having an element $U_j$ for each word $T_j$ represented in the feature vectors of document space model 186. Each element $U_j$ is generated using Bayesian theory as follows:

$$U_j = \frac{P(I_{ri} | T_j)P(T_j)}{P(I_{ri})}$$

The probabilities used to generate the user space vector U are calculated as follows:

$$P(I_{ri} | T_j) = \frac{N_{ri}(T_j)}{N_Q(T_j)}$$

$$P(T_j) = \frac{N_Q(T_j)}{N_Q}$$

$$P(I_{ri}) = \frac{N_{ri}}{N_Q}$$

where $N_{ri}$ represents the number of query times that image $I_{ri}$ has been retrieved and marked as relevant, $N_Q$ represents the total number of queries in user log 190, $N_{ri}(T_j)$ represents the number of query times that image $I_{ri}$ has been retrieved and marked as relevant for those queries that contain the word $T_j$, and $N_Q(T_j)$ represents the number of queries that contain the word $T_j$.

Additionally, for each irrelevant image $I_{ii}$ a vector V is calculated to identify the confidence that image $I_{ii}$ is irrelevant to word $T_j$, the vector V having an element $V_j$ for each word $T_j$ represented in the feature vectors of document space model 186. Each element $V_j$ is calculated as follows:

$$V_j = \frac{N_u(T_j)}{N_Q(T_j)}$$

where $N_{ii}(T_j)$ represents the number of query times that image $I_{ii}$ has been retrieved and marked as irrelevant for those queries that contain the word $T_j$, and $N_Q(T_j)$ represents the number of queries that contain the word $T_j$. It should be noted that an image that is marked as relevant by one user (or in one query) can be marked as irrelevant by another user (or in another query). Thus, an image may have associated with it both a vector U and a vector V.

Model updator 234 can use user space model 232 in a variety of different manners. In one implementation, model updator 234 uses the vectors in user space model 232 to modify the high-level feature vectors in document space 186. For each image I for which there is a user space model vector U in user space model 232, model updator 234 modifies the high-level feature vector D in document space model 186 corresponding to the image I. The modification is performed as follows, resulting in a new high-level feature vector $D_{new}$:

$$D_{new} = \eta U + (1-\eta)D$$

where η represents the confidence of the vector U in the user space model. The value of η can vary between 0.0 (no confidence in the vector U) and 1.0 (complete confidence in the vector U). In one implementation, the value of η is initially set to 0.4, but can be subsequently increased as the amount of data in user log 190 increases.

Irrelevant images can be used to further refine document space model 186 as follows, resulting in a new high-level feature vector $D_{final}$:

$$D_{final} = D_{new} * (1-V)$$

Model updator 234 can further use the user space model 232 to adjust weights within the document space model 186. As discussed above, the high-level feature vector can be based on a variety of different text features. These different text features can be weighted, with the text features initially being assigned equal weights and then changing these weights based on user space model 232. Model updator 234 changes these weights by comparing user space model 232 to the original document space model 186 (prior to its being modified by model updator 234). If the words of a particular text feature have smaller values in document space model 186, and/or have high values in the irrelevant vector (V) in user space model 232, then model updator 234 concludes that that particular text feature has a small contribution in the text features of the image and the weight for that particular text feature can be decreased. Conversely, if the words of a particular text feature have larger values in document space model 186, and/or have high values in the relevant vector (U) in user space model 232, then model updator 234 concludes that that particular text feature has a larger contribution in the text features of the image and the weight for that particular text feature can be increased. Alternatively, model updator 234 may communicate the information from user space model 232 to media content indexer 136 in order for indexer 136 to make these weight-based modifications to the feature vectors.

For example, the words extracted from the web page in the area to the left of an image may have smaller values in the document space model 186 or higher values in the irrelevant vector in the user space model 232. The weight of the words extracted from the web page in the area to the left of the image are thus decreased.

These modified weights can further be applied to other features extracted from web pages at the same source. Model updator 234 (or alternatively contact indexer 136) uses the average weight of the text features for additional web pages collected from the same web site, and thus provides default weights that need not be equal.

Model updator 234 can further use user log 190 to adjust the weight between high-level and low-level feature vectors as used by matching module 184 (the value α discussed above). For each relevant image, if the difference between the high-level query and feature vectors is less than the difference between the low-level query and feature vectors, then the high-level features (the semantic features) can be assumed to be more important for the query and the value of α adjusted accordingly to give more weight to the high-level features. Similarly, if the difference between the low-level query and feature vectors is less than the difference between the high-level query and feature vectors, then the low-level features (the semantic features) can be assumed to be more important for the query and the value of α adjusted accordingly to give more weight to the low-level features.

Figure 5:
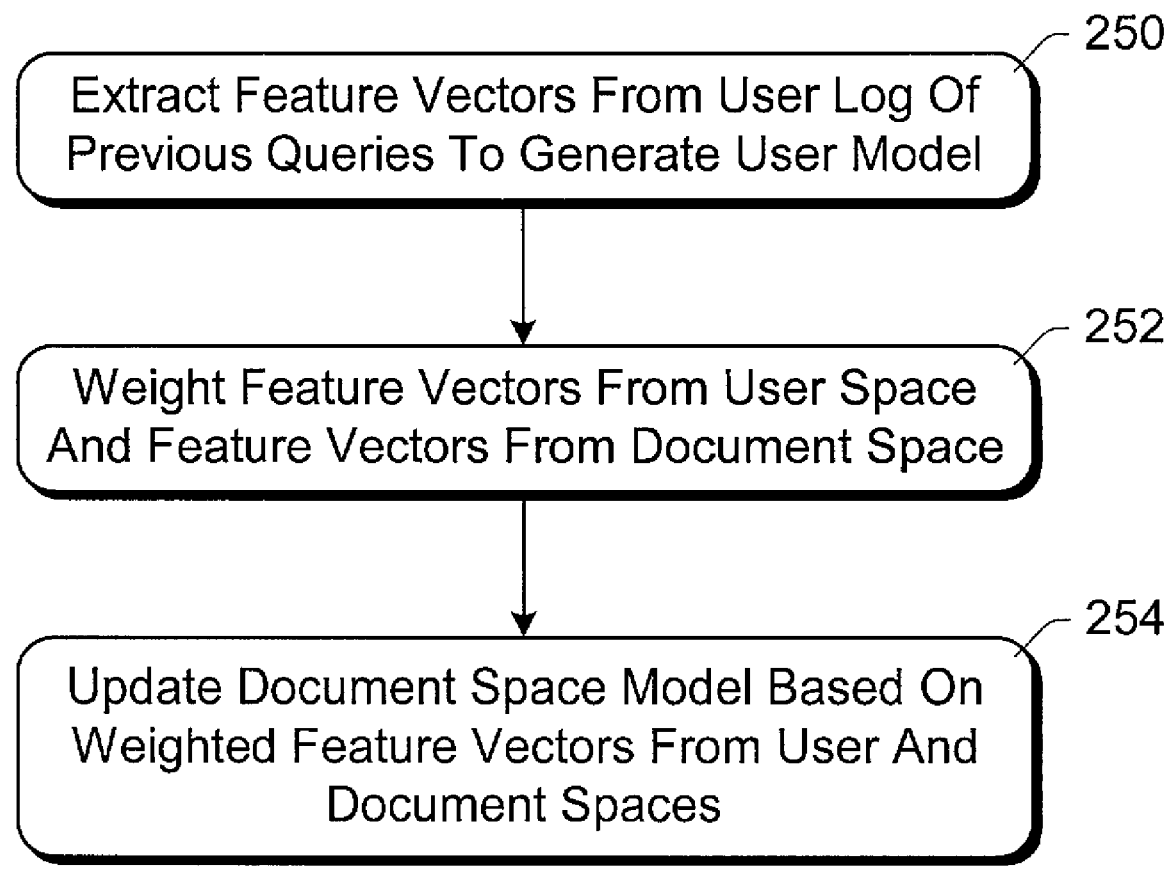
FIG. 5 is a flowchart illustrating an exemplary user log mining process in accordance with certain embodiments of the invention.

FIG. 5 is a flowchart illustrating an exemplary user log mining process in accordance with certain embodiments of the invention. The process of FIG. 5 is performed by retrieval component 124, and may be implemented in software.

Initially, feature vectors are extracted from the user log of previous queries to generate a user space model (act 250). The feature vectors from the user space model and from the document space model are then weighted appropriately (act 252), and the document space model is updated based on the weighted feature vectors (act 254).

Figure 6:
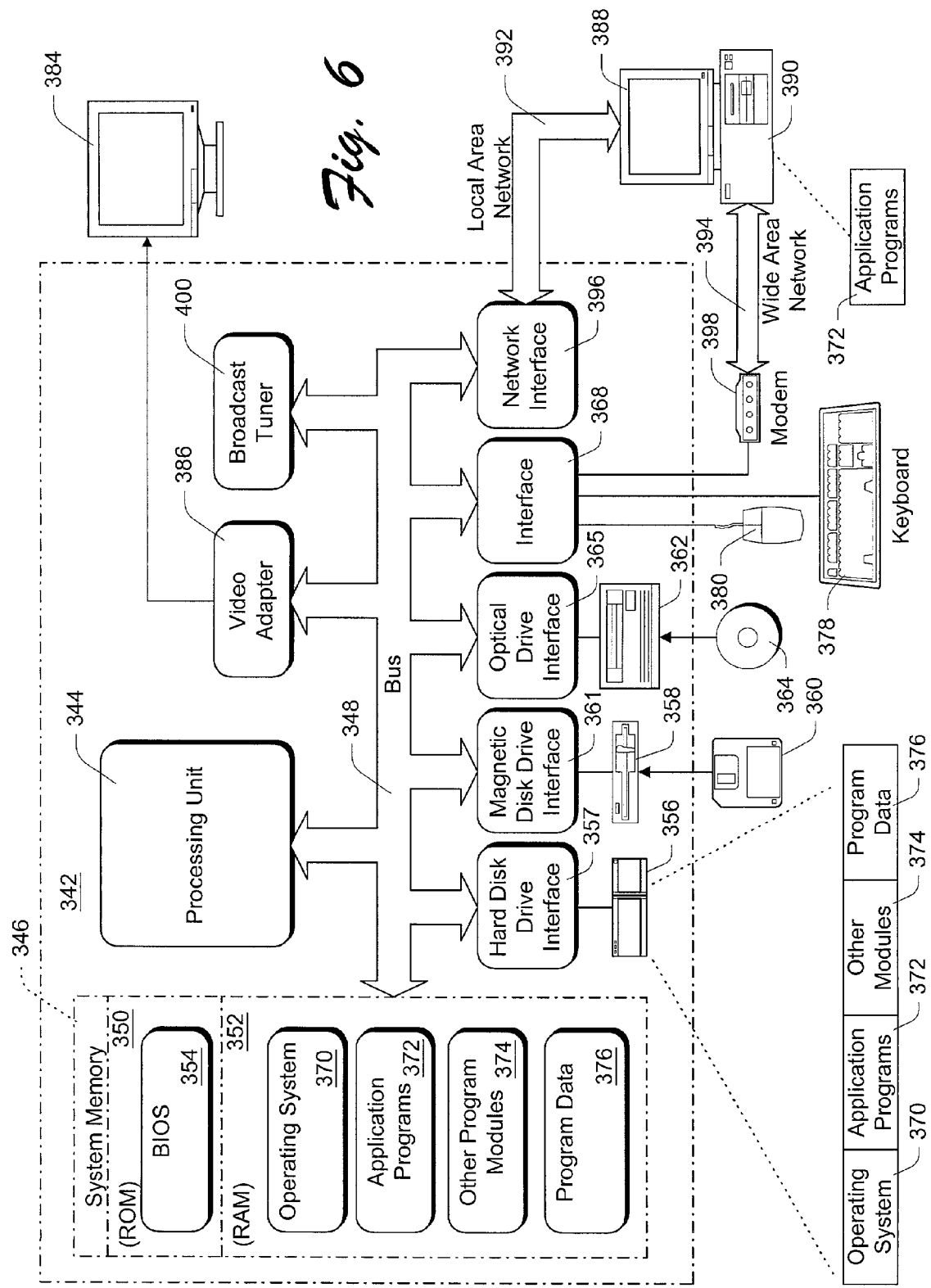
FIG. 6 illustrates an example of a suitable operating environment in which the invention may be implemented.

FIG. 6 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

FIG. 6 shows a general example of a computer 342 that can be used in accordance with the invention. Computer 342 is shown as an example of a computer in which various embodiments of the invention can be practiced, and can be used to implement, for example, a client 102 of FIG. 1, a data collection and indexing component 126, a retrieval component 124, or a user interface component 122 of FIG. 2, etc. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as a keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (USB) interface, etc.). A monitor 384 or other type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 6. The logical connections depicted in FIG. 6 include a local area network (LAN) 392 and a wide area network (WAN) 394. Such networking environments are commonplace in offices, enterprise-wide computer networks, intranets, and the Internet. In certain embodiments of the invention, computer 342 executes an Internet Web browser program (which may optionally be integrated into the operating system 370) such as the "Internet Explorer" Web browser manufactured and distributed by Microsoft Corporation of Redmond, Washington.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 also includes a broadcast tuner 400. Broadcast tuner 400 receives broadcast signals either directly (e.g., analog or digital cable transmissions fed directly into tuner 400) or via a reception device (e.g., via antenna or satellite dish).

Computer 342 typically includes at least some form of computer readable media. Computer readable media can be any available media that can be accessed by computer 342. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
   receiving search criteria;
   identifying, based at least in part on the search criteria, a piece of media content to be rendered;
   receiving, after rendering of the piece of media content, user feedback regarding relevancy of the piece of media content;
   weighting for another piece of media content, based on the user feedback, both a result of comparing a high-level query vector to a high-level feature vector of the other piece of media content and a result of comparing a low-level query vector to a low-level feature vector of the other piece of media content; and
   combining the weighted result to determine whether to identify the other piece of media content for rendering.

2. The method of claim 1, further comprising generating a new high-level query vector and a new low-level query vector based at least in part on the search criteria.

3. The method of claim 1, further comprising:
   generating a user space vector corresponding to the piece of media content; and
   using the user space vector corresponding to the piece of media content to modify the high-level feature vector corresponding to the piece of media content.

4. A The method of claim 1, further comprising altering a weighting of one or more elements in the feature vector based on the user feedback.

5. The method of claim 1, wherein the high-level feature vector of the other piece of media content is a text feature vector.

6. One or more computer-readable memories containing a computer program that is executable by a processor to perform the method recited in claim 1.

* * * * *